United States Patent [19]
Tour

[11] Patent Number: 6,065,874
[45] Date of Patent: May 23, 2000

[54] LINEAR BEARING

[76] Inventor: Benjamin Tour, P.O. Box 633, Ofakim, Israel

[21] Appl. No.: 08/918,481

[22] Filed: Aug. 26, 1997

[51] Int. Cl.$^7$ .............................. F16C 29/04; F02B 53/00
[52] U.S. Cl. ........................... 384/57; 123/228; 123/229; 384/49; 418/235; 418/247
[58] Field of Search ................................ 123/228; 384/7, 384/26, 49, 50, 57

[56] References Cited

U.S. PATENT DOCUMENTS

| | | |
|---|---|---|
| 6,962 | 12/1849 | Thompson . |
| 987,486 | 3/1911 | Peterson et al. . |
| 1,061,107 | 5/1913 | Nordmark . |
| 1,280,915 | 10/1918 | Weidenbach . |
| 1,721,855 | 7/1929 | Burrow . |
| 1,846,298 | 2/1932 | Alcznauer . |
| 2,045,081 | 6/1936 | Hart . |
| 3,040,530 | 6/1962 | Yalnizyan ................................ 60/39.61 |
| 3,323,500 | 6/1967 | Murin . |
| 3,949,712 | 4/1976 | Thaler . |
| 4,086,881 | 5/1978 | Rutten . |
| 4,683,852 | 8/1987 | Kypreos-Pantazis . |
| 4,895,117 | 1/1990 | Yang . |
| 4,961,649 | 10/1990 | Mottate ..................................... 384/57 |
| 5,579,733 | 12/1996 | Tour . |

FOREIGN PATENT DOCUMENTS

| | | |
|---|---|---|
| 1131238 | 10/1956 | France . |
| 356724 | 7/1922 | Germany . |
| 57-90417 | 6/1982 | Japan ........................................ 384/49 |
| 4627 | of 1900 | United Kingdom . |

*Primary Examiner*—Michael Koczo
*Attorney, Agent, or Firm*—Limbach & Limbach

[57] ABSTRACT

Prior art linear bearings generally have a roller element which, in such a reciprocating motion application, tend to creep or slide along the surfaces upon which they roll. This is due to unequal frictional forces between the rolling surfaces. The linear bearing of the present invention substantially prevents straying and/or sliding of roller elements, and therefore provides bearing functionality at high speeds and great loads with longer longevity and reliability. The linear bearing can be used in many engineering applications, such as in a rotary engine, for example.

2 Claims, 15 Drawing Sheets

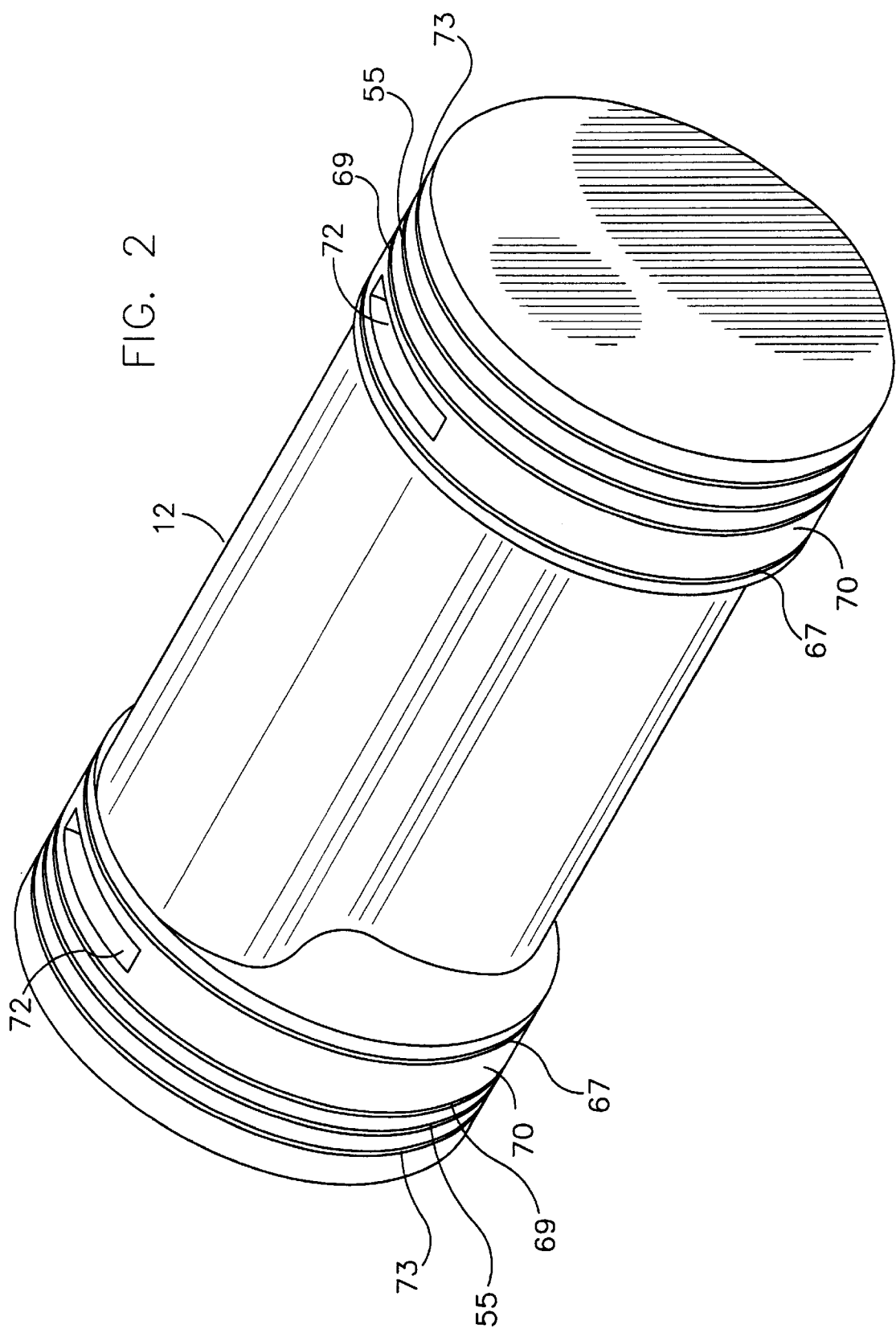

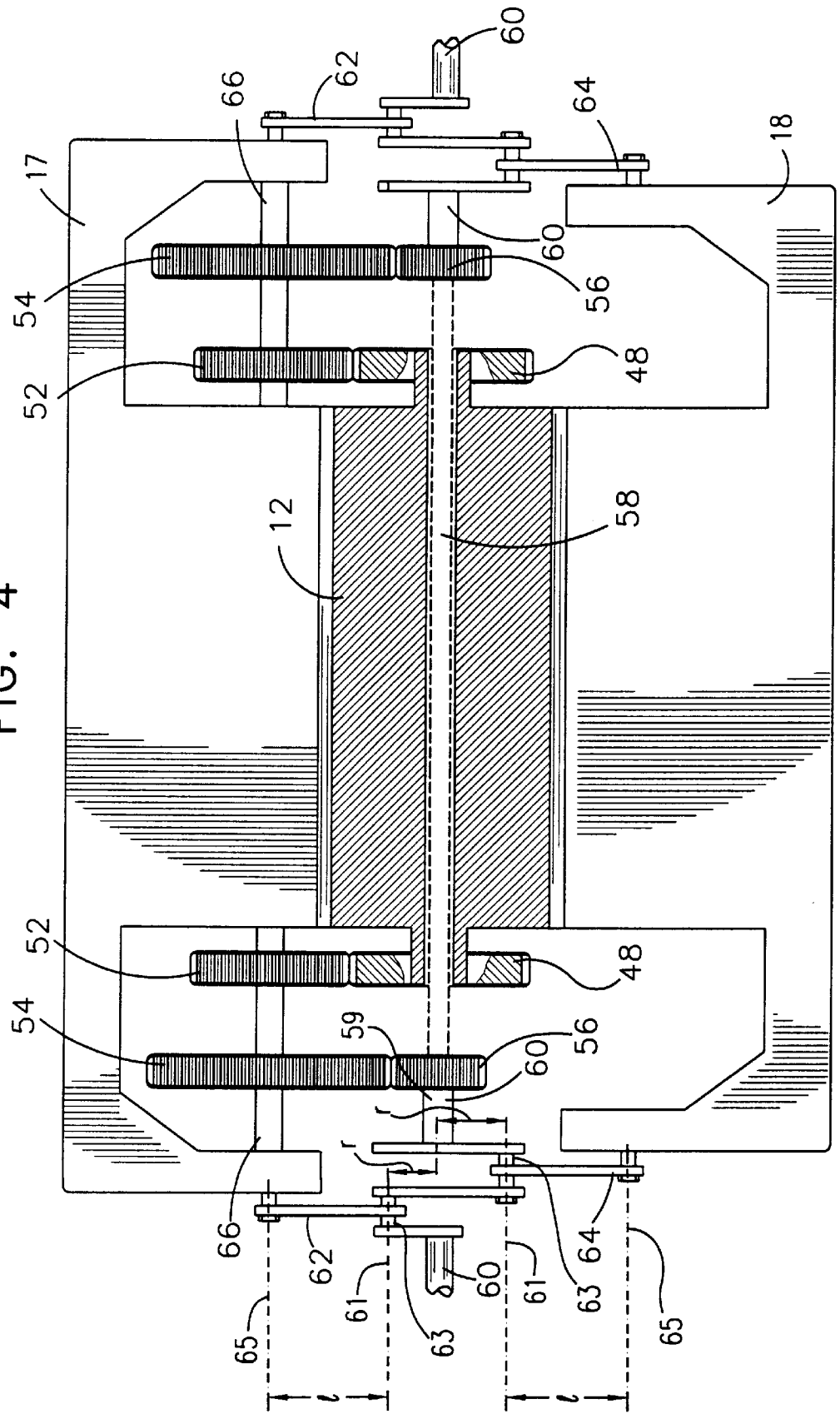

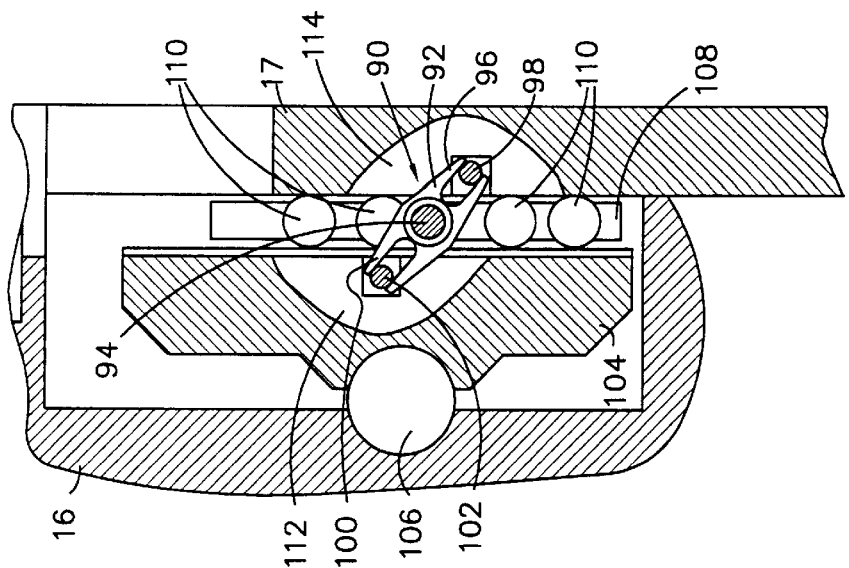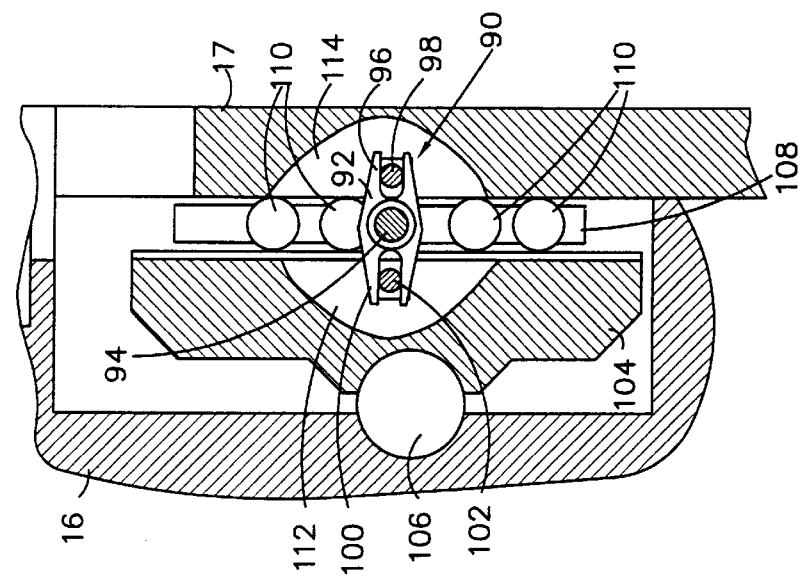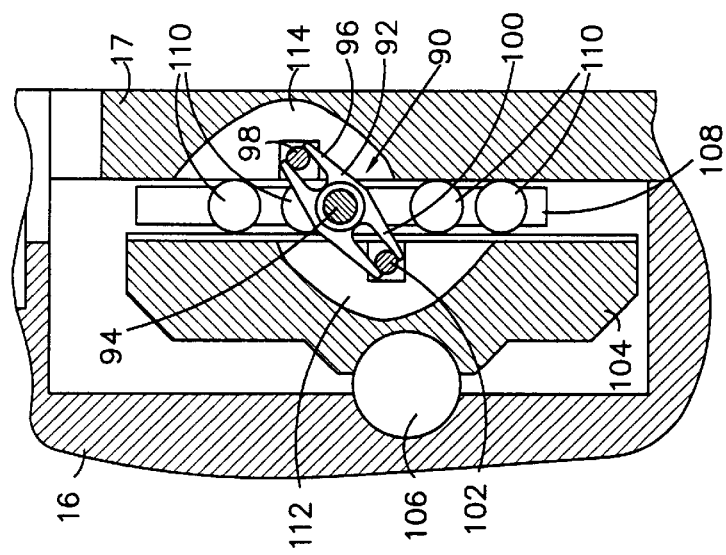

LINEAR BEARING

FIELD OF THE INVENTION

The present invention relates to rotary engines generally, and particularly to an improved rotary engine with abutments.

BACKGROUND OF THE INVENTION

Rotary engines are an alternative to conventional piston driven engines. One of the challenges in the design of rotary engines is the problem of isolating the various stages of the combustion cycle from one another while striving to maximize the efficiency of the engine.

One solution to this challenge uses abutments which separate the housing in which the rotor rotates into various isolated chambers, each chamber being dedicated to a particular phase of the combustion cycle. The abutments generally move linearly in timed relation to the rotary motion of the rotor.

Various abutment type rotary engines have been patented. The following patents are believed to be representative of the prior art: U.S. Pat. Nos. 6,962, 1,061,107, 1,721,855, 1,846,298, 2,045,081, 3,040,530, 3,323,500, German Patent 356,724, French Patent 1,131,238, and British Patent 4,627. Abutment type rotary engines known in the prior art generally suffer from a common problem: the inability to move the abutments smoothly and efficiently in timed relation to the rotor, while sealing the chambers formed by the abutments and rotor housing from each other. In most prior art abutment type rotary engines, in order to seal the chambers formed by the abutments and rotor housing, springs are employed to bias the abutments against the surface of the rotor. The spring force causes excessive wear on both the rotor and abutments, which degrades the seal and reduces the overall efficiency of the engine.

U.S. Pat. No. 1,846,298 to Alcznauer describes an abutment type of rotary engine which uses a gear mechanism coupled to the rotor of the engine which is involved in moving the abutments. However, the abutments are retracted relative to the rotor by cams mounted on a shaft, and the abutments are held in engagement with the rotor by springs and rocker arms, again causing wear on the rotor and abutments.

U.S. Pat. No. 5,579,733 to the present applicant/assignee, the disclosure of which is incorporated herein by reference, discloses a mechanically efficient, rotary engine with abutments. The abutments move in timed relation to the rotor using a gear train without cams, and no biasing devices force the abutments against the surface of the rotor. In addition, the engine requires no valves. The engine is suitable for use not only as an internal combustion engine, but also as a power source for compressors and pumps for liquids and gases.

SUMMARY OF THE INVENTION

The present invention seeks to provide a mechanically efficient, rotary engine with abutments. The present invention comprises several improvements to the engine disclosed in U.S. Pat. No. 5,579,733, among them a linear bearing which maintains the abutments generally parallel to the housing as the abutments move within the cavity. The linear bearing substantially prevents straying and/or sliding of roller elements of the bearing, and therefore provides bearing functionality at high speeds and great loads with longer longevity and reliability.

There is thus provided in accordance with a preferred embodiment of the present invention a rotary engine including a housing having an inner cavity, a combustion chamber, an intake port and an exhaust port, a rotor operatively connected to the housing such that the rotor can rotate within the cavity, the rotor having end portions adapted to be in constant operative contact with the housing during rotation of the rotor, a first abutment and a second abutment operatively connected to the housing and extending into the inner cavity such that the abutments are in operative contact with the rotor, the abutments and the rotor being located such that the inner cavity is divided into a first, a second, a third and a fourth chamber, and a gear train operatively connected to the rotor and the abutments for moving the abutments within the inner cavity such that the abutments are in constant contact with the rotor while the rotor rotates within the inner cavity, characterized by the rotor having formed therein at least one groove for transferring therethrough a fluid from a relatively high pressure in the second chamber to a relatively low pressure in the combustion chamber.

In accordance with a preferred embodiment of the present invention the rotor, during rotation thereof, causes compression of the fluid in the second chamber, and during the compression, the rotor and the second abutment substantially seal the combustion chamber from the compressed fluid and the at least one groove is substantially not in fluid communication with the combustion chamber. Preferably the rotor is generally drum shaped. Preferably the rotor is formed with a pair of the grooves spaced generally 180° from one another. Preferably the at least one groove subtends approximately 30–80° of arc. Preferably a centerline of the at least one groove is offset from a centerline of the rotor by approximately 20–60°.

Additionally in accordance with a preferred embodiment of the present invention the rotor includes truncated ends which have an outer contour shaped to match an inner contour on the inner cavity. Preferably each truncated end subtends approximately 10–30° of arc.

In accordance with a preferred embodiment of the present invention the at least one groove is substantially sealed by means of pressurized oil flowing through a channel formed in the rotor axially outwards of the at least one groove.

Further in accordance with a preferred embodiment of the present invention the rotor having a profile defined by the equation R=radius of the inner cavity for values of $0° \leq a \leq Y°$
and $180° \leq a \leq 180+Y°$,
and elsewhere $$R = r\cos 2a + \sqrt{l^2 - r^2\sin^2 2a} - H$$

where R is a local radius of the rotor, a is a local rotor radius angle, r is a radius associated with the crankshaft, l is a length associated with the linkage arm, H is a height of each abutment, and Y is an angle subtended by each end portion of the rotor.

Additionally in accordance with a preferred embodiment of the present invention, a motion of each abutment is defined by the equation:

$$P = r\cos 2a + \sqrt{l^2 - r^2 \sin^2 2a} - H$$

where P is the path traveled by the abutment with respect to the center of the rotor.

Additionally in accordance with a preferred embodiment of the present invention, the combustion chamber includes an outlet portion and at least one inlet portion adapted to transfer a fluid mixture to the outlet portion, wherein the at least one inlet portion is adapted to delay transfer of a volume of the fluid mixture to the outlet portion until at least a portion of a previously transferred volume of the fluid mixture exits the outlet portion.

In accordance with a preferred embodiment of the present invention, the combustion chamber includes a plurality of conical regions having a common apex region, wherein each at least one inlet portion is situated at a base portion of each of the plurality of conical regions and the outlet portion is situated at the common apex region. Preferably at least one inlet portion is adapted to impart a generally swirling motion to the combustible fluid mixture.

There is also provided in accordance with a preferred embodiment of the present invention, a combustion chamber having an exit port and a restricter operative to control pressure inside the combustion chamber.

In accordance with a preferred embodiment of the present invention, there is provided a combustion chamber having an exit port and a restricter operative to change a cross-sectional area of the exit port of the combustion chamber.

Additionally in accordance with a preferred embodiment of the present invention, the restricter is operated in a control loop. Alternatively, the restricter may be operated manually.

Further in accordance with a preferred embodiment of the present invention, there is provided a linear bearing operative to maintain the abutments generally parallel to the housing as the abutments move within the cavity. The linear bearing substantially prevents straying and/or sliding of roller elements of the bearing, and therefore provides bearing functionality at high speeds and great loads with longer longevity and reliability.

Still further in accordance with a preferred embodiment of the present invention, there is provided a linear bearing including a fork having a first throat and a second throat, the fork being pivoted about a pivot, the first throat being slidably engaged with one of the abutments and the second throat being slidably engaged with the housing, such that as the abutment moves within the cavity, the fork pivots about the pivot, the first throat slides with respect to the abutment and the second throat slides with respect to the housing such that the abutment remains generally parallel to the housing.

Additionally in accordance with a preferred embodiment of the present invention, each of the abutments has a channel adapted to transfer fluid from a first side of the abutment to a second side of the abutment.

In accordance with a preferred embodiment of the present invention, at least one crankshaft is operative to store angular momentum.

BRIEF DESCRIPTION OF THE DRAWINGS

The present invention will be understood and appreciated from the following detailed description, taken in conjunction with the drawings in which:

FIG. 2 is a simplified illustration of a rotor of the rotary engine of FIGS. 1A–1H.

FIG. 4 is a simplified illustration of a preferred embodiment of a gear train which couples and synchronizes the movement of the abutments of the rotary engine with the rotation of the rotor;

FIGS. 6A–6C are illustrations of a preferred embodiment of a linear bearing of the rotary engine shown in FIG. 1A–1H.

DETAILED DESCRIPTION OF PREFERRED EMBODIMENTS

Reference is made to FIGS. 1A–1H which illustrate a rotary engine 10 constructed and operative in accordance with a preferred embodiment of the present invention. FIGS. 1A–1H illustrate the operating cycle of the engine 10 which will be described further below.

Figure 1A:
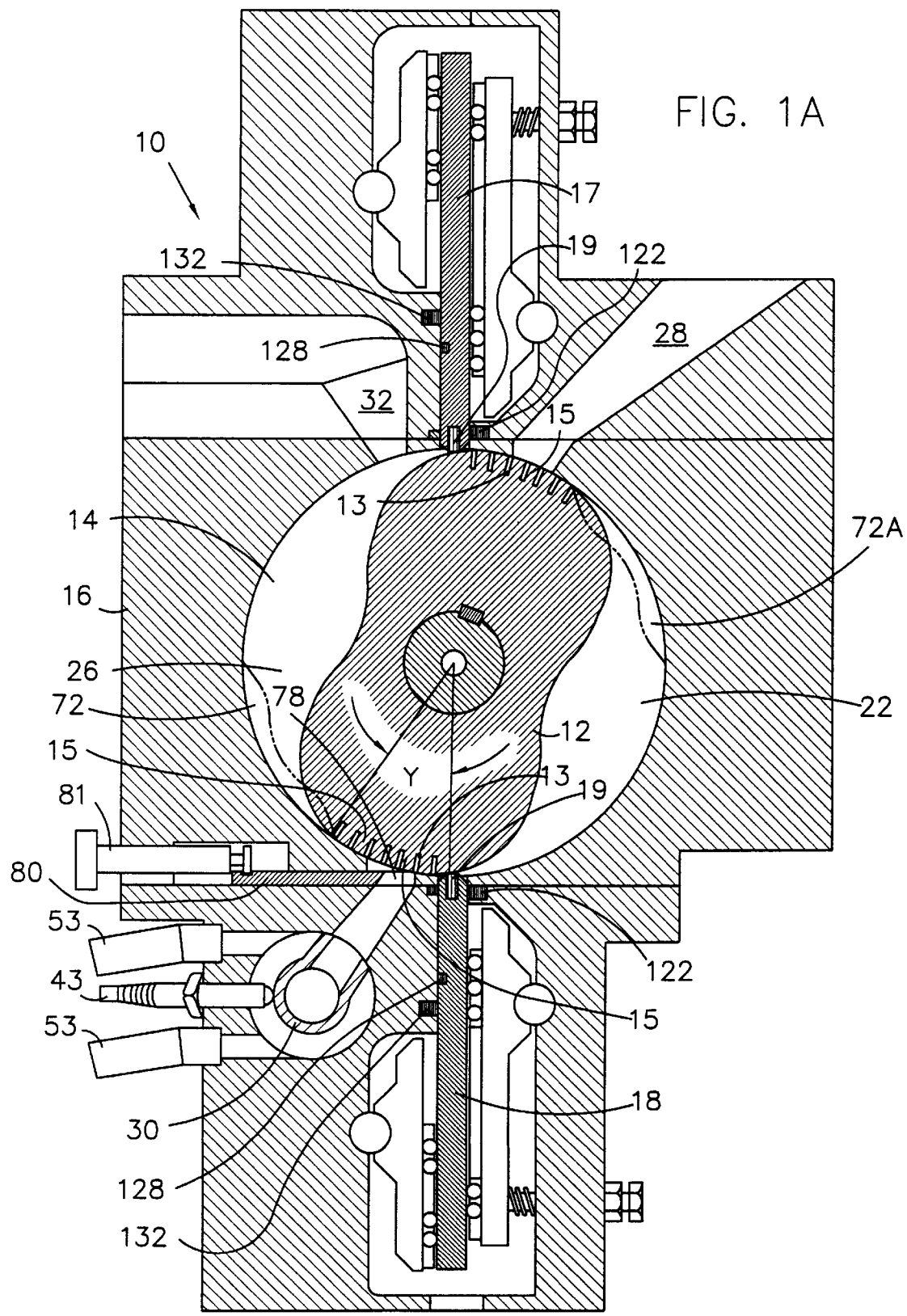
FIGS. 1A–1H are partial sectional simplified illustrations of a rotary engine constructed and operative in accordance with a preferred embodiment of the present invention.

As seen in FIG. 1A, the engine 10 has a rotor 12 adapted to rotate within an inner cavity 14 of a housing 16. The inner cavity 14 is preferably of generally circular cross section and is therefore easily formed by machining. Associated with the inner cavity 14 is a pair of abutments, a first abutment 17 and a second abutment 18, which can move linearly upwards and downwards as seen in FIGS. 1A–1H.

Figure 1B:
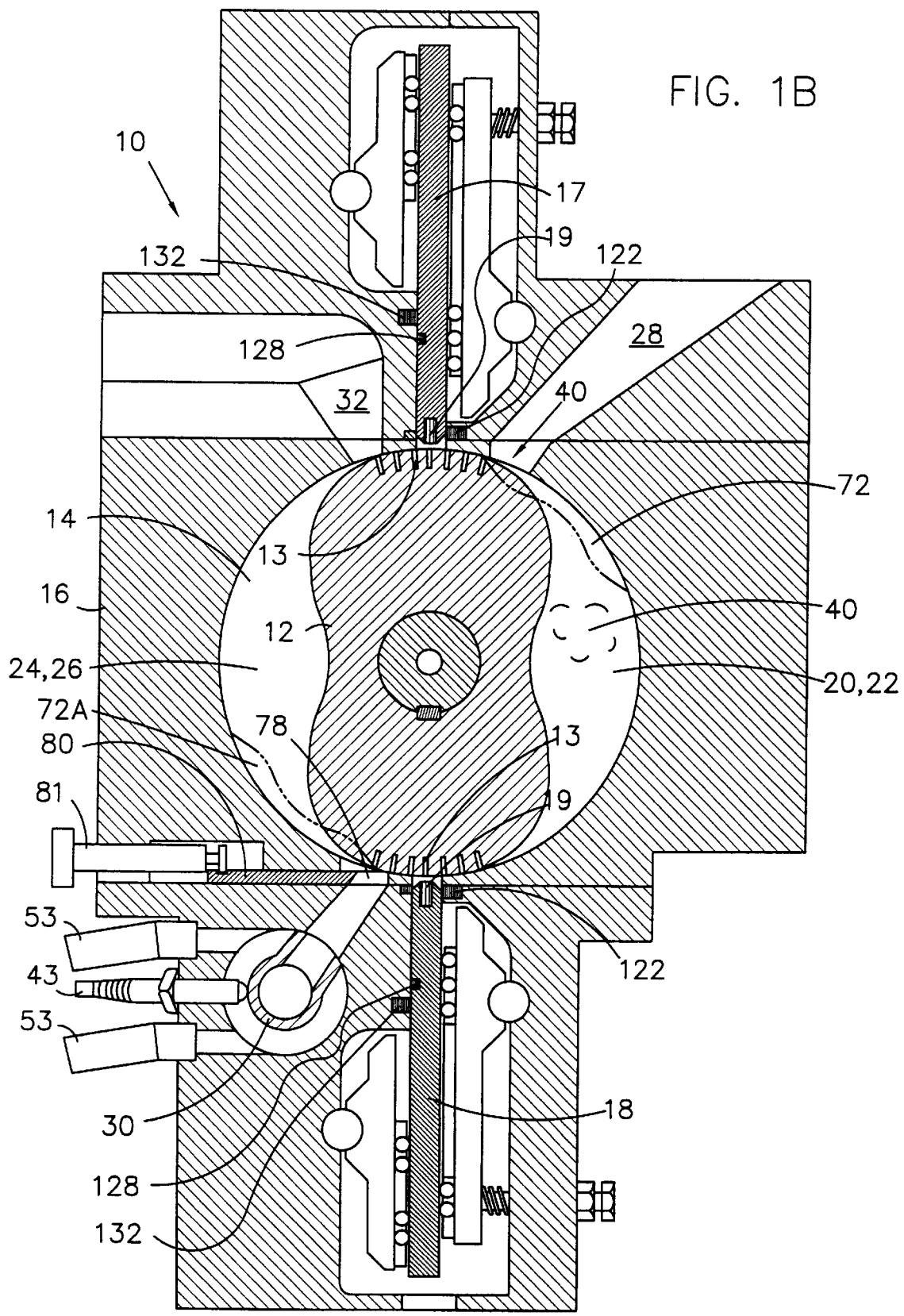

As the rotor 12 rotates within the inner cavity 14, different chambers are formed, as is now described. Within the housing 16, the first abutment 17 and the rotor 12 define a first chamber 20, as seen clearly in FIG. 1C. The second abutment 18 and the rotor 12 define a second chamber 22 and a third chamber 24. The first abutment 17 and the rotor 12 define a fourth chamber 26. The housing 16 is also provided with an intake port 28, a combustion chamber 30 and an exhaust port 32. The intake port 28 is adapted for drawing air 40 therethrough, as seen in FIG. 1B.

Reference is now made to FIG. 2 which illustrates rotor 12. Rotor 12 is preferably drum shaped. A ring 70 is preferably rigidly mounted at each end of the rotor 12. Each ring 70 is preferably provided with a pair of grooves 72 spaced generally 180° from one another, one pair of which is also shown in FIGS. 1A–1H. Each groove 72 preferably subtends approximately 30–80° of arc and the centerline of each groove 72 is preferably offset from the centerline of the rotor 12 by approximately 20–60°.

In accordance with a preferred embodiment of the present invention, each groove 72 is substantially sealed by a pair of seals, such as metal ring seals 67 and 69, placed on either side of groove 72. In addition, it is a particular feature of the present invention that each groove 72 is further sealed by pressurized oil flowing in a circumferential channel 55 formed in ring 70 axially outside of groove 72, and by another seal, such as a metal ring seal 73, placed axially outside of channel 55. As will be described hereinbelow, grooves 72 are used as passageways for flow therethrough of fluids, and metal ring seals 67 and 69, together with the pressurized oil in channel 55 and metal ring seal 73, seal this passageway so that no fluid leaks therefrom.

The operating cycle of the engine 10 is now described with reference to FIGS. 1A–1H. An initial state is shown in FIG. 1A in which the intake port 28 is substantially blocked by the rotor 12. As the rotor 12 rotates clock-wise from the position shown in FIG. 1A to the top dead center (TDC) position shown in FIG. 1B, air 40 is drawn into the first chamber 20. This is called the intake portion of the operating cycle, and preferably comprises a rotation of approximately 165–179°.

For the sake of clarity, the grooves which participate in the described operating cycle are designated 72 in FIGS. 1A–1H, whereas the grooves which do not participate in the cycle described are designated 72A.

It is noted that grooves 72 and 72A, rotor 12 and inner cavity 14 are configured such that grooves 72 and 72A are not in the same plane as the intake 28 and exhaust 32 ports. Only rotor 12 can communicate with the intake 28 and exhaust 32 ports. Thus there is no fluid communication between the intake 28 and exhaust 32 ports. It is possible, however, to construct the engine 10 so that fluid communication does exist between ports 28 and 32 during some portion of the operating cycle, thereby providing exhaust gas recirculation if so desired.

Figure 1C:
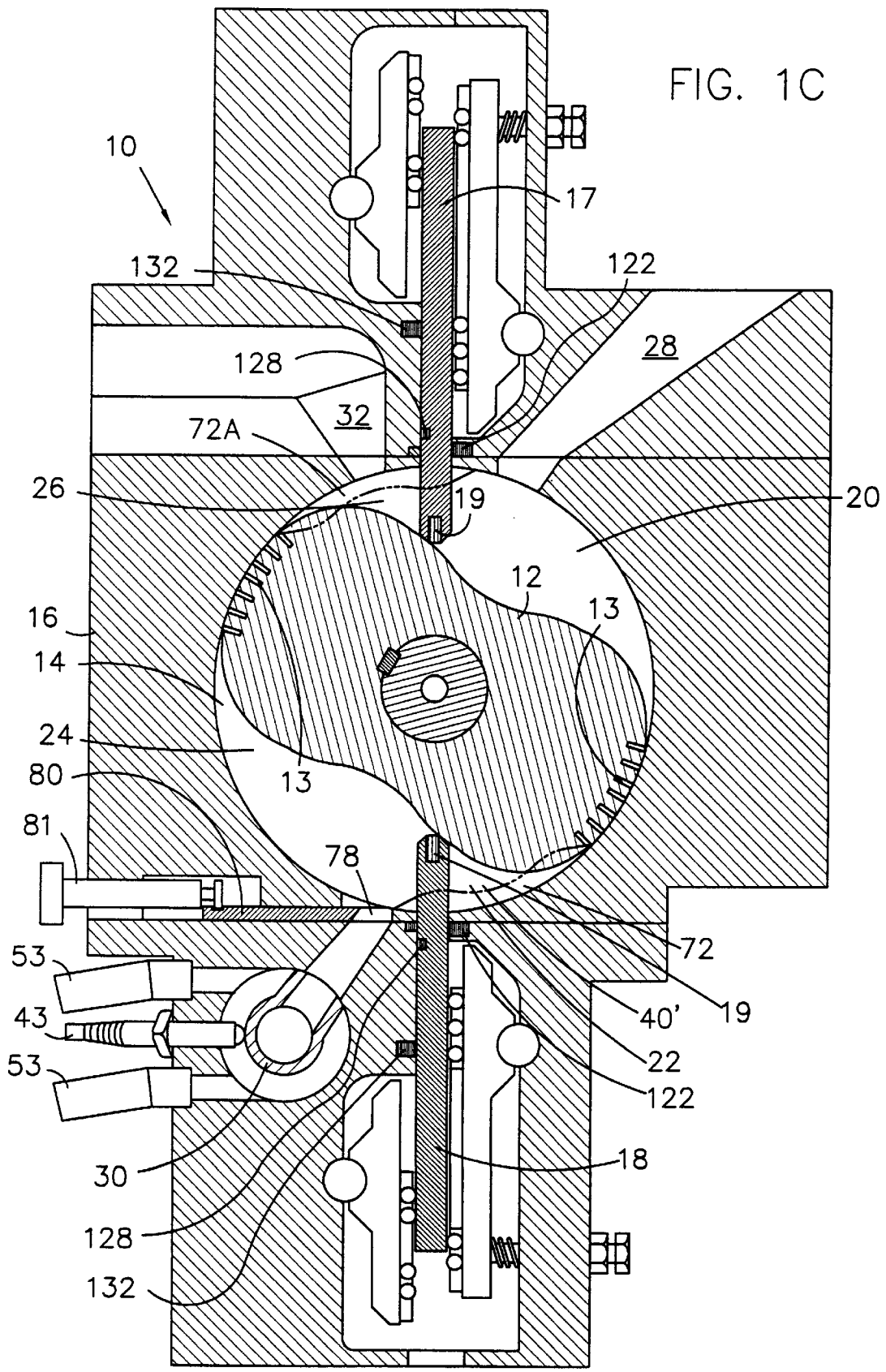

As rotor 12 continues to rotate from TDC shown in FIG. 1B to the position shown in FIG. 1C, preferably a rotation of approximately 100–120°, compression of air 40 occurs in chamber 22, the compressed air being designated 40' for the sake of clarity. During this compression, rotor 12 and second abutment 18 substantially seal combustion chamber 30 from the compressed air 40'. The grooves 72 do not yet communicate with the combustion chamber 30.

Figure 1D:
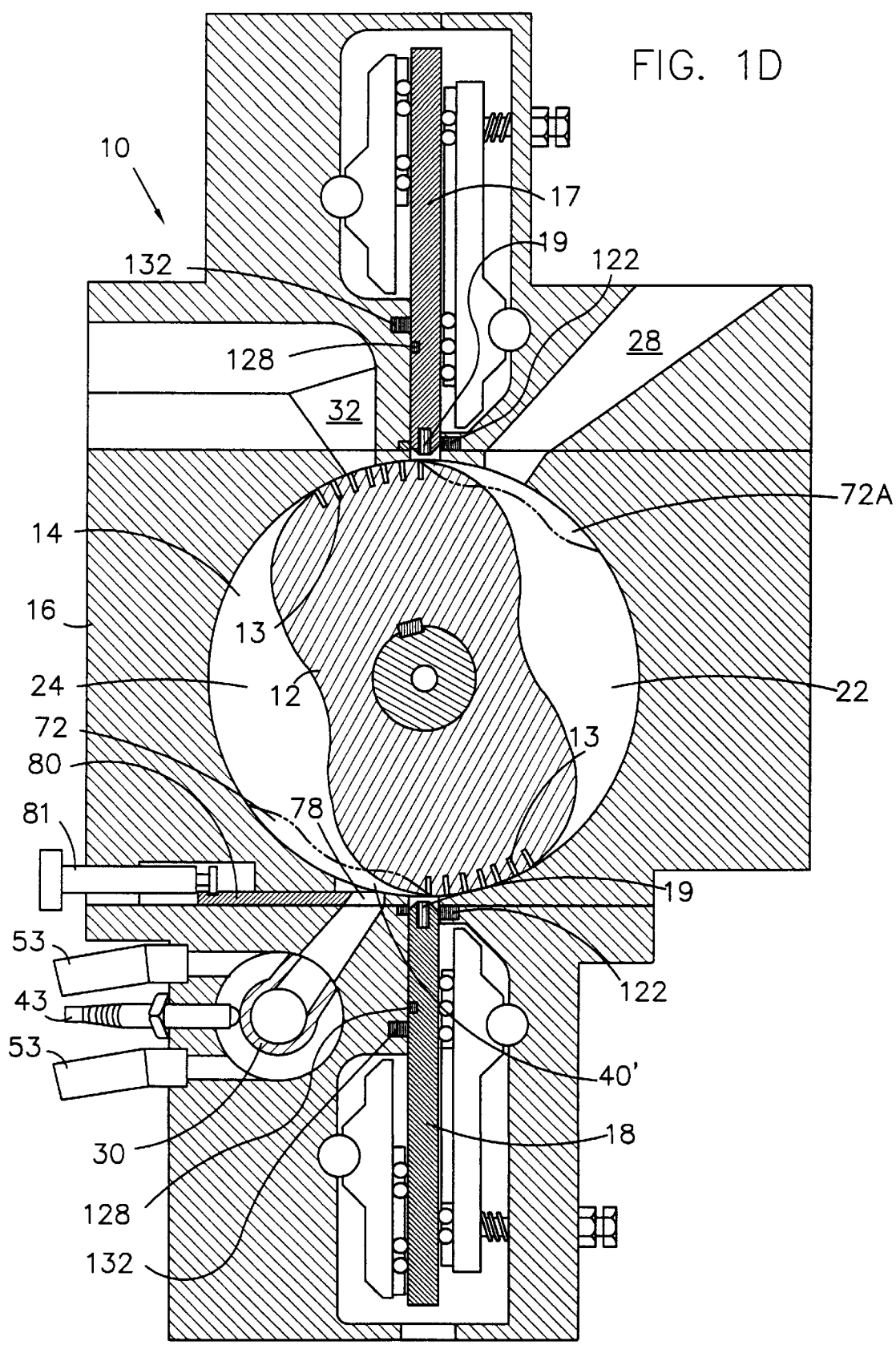

As soon as rotor 12 continues to rotate past the position shown in FIG. 1C towards the position shown in FIG. 1D, combustion chamber 30 comes into fluid communication with the grooves 72 and chamber 22. Since there is relatively high pressure in chamber 22 and relatively low pressure in combustion chamber 30, compressed air 40' flows from chamber 22 to combustion chamber 30 via the grooves 72.

Figure 3A:
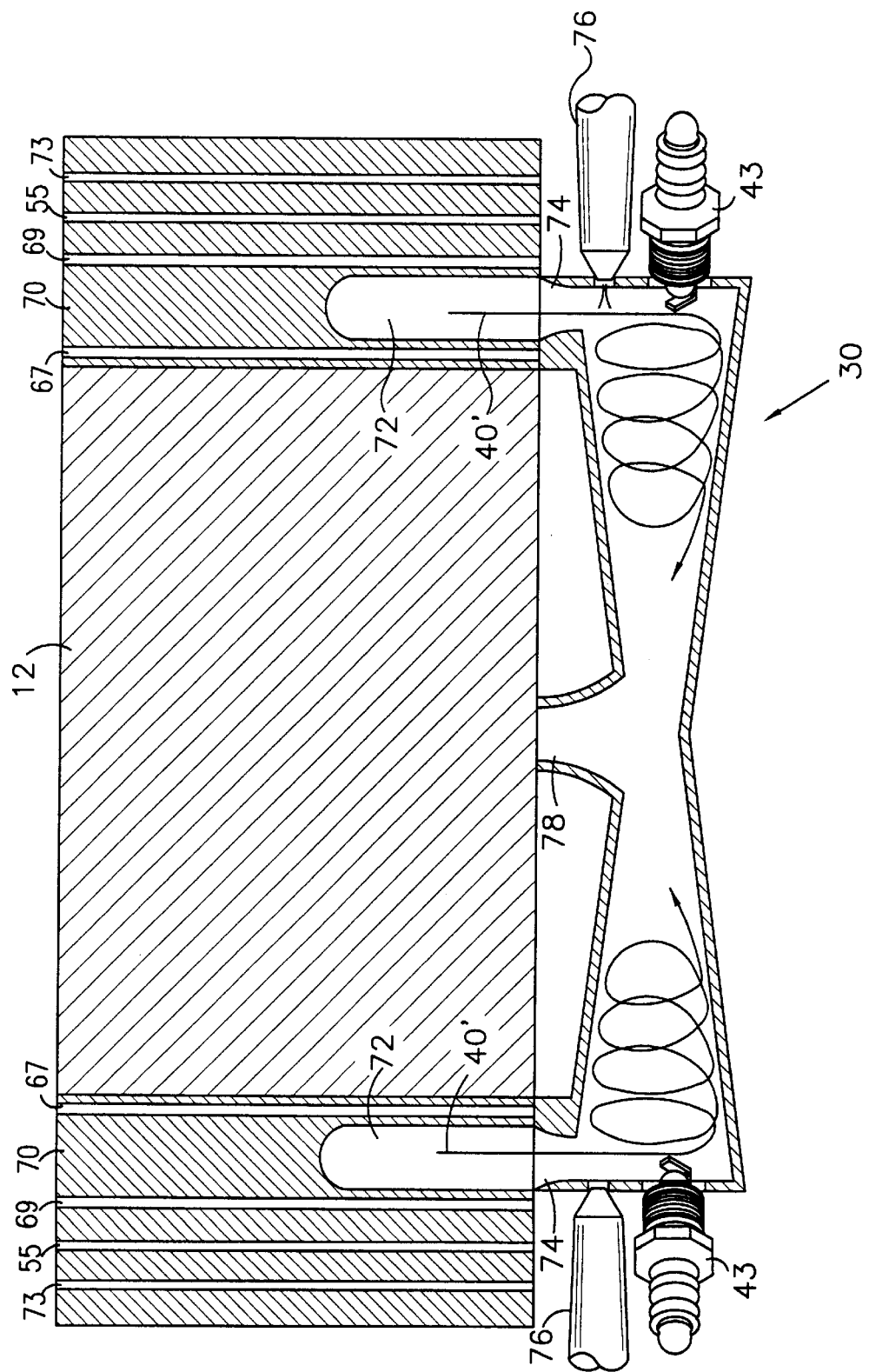
FIGS. 3A and 3B are simplified illustrations of a preferred embodiment of a combustion chamber of the rotary engine shown in FIGS. 1A–1H, wherein FIG. 3A corresponds to the position of the rotor shown in FIG. 1D and FIG. 3B corresponds to the position of the rotor shown in FIG. 1E.

Reference is now additionally made to FIG. 3A, which illustrates pictorially the relative position of rotor 12, grooves 72 and combustion chamber 30 in the position shown in FIG. 1D. It is seen in FIG. 3A that combustion chamber 30 is provided with an exit port 78 for expulsion of exploded fuel-air mixture (not shown). As seen in FIG. 3A, rotor 12 substantially seals exit port 78 during transfer of compressed air 40' from chamber 22 via grooves 72 into combustion chamber 30. (It is appreciated that the sealing of exit port 78 by rotor 12 is not apparent in FIG. 1D because the sectional illustration in FIG. 1D is not in the same plane as exit port 78.)

Thus, compressed air 40' is introduced into combustion chamber 30 without any valves, and no valves are used at the intake 28 and the exhaust 32 ports as well.

The rotation of rotor 12 from the position shown in FIG. 1C to the position shown in FIG. 1D is approximately 40–50°.

Figure 1E:
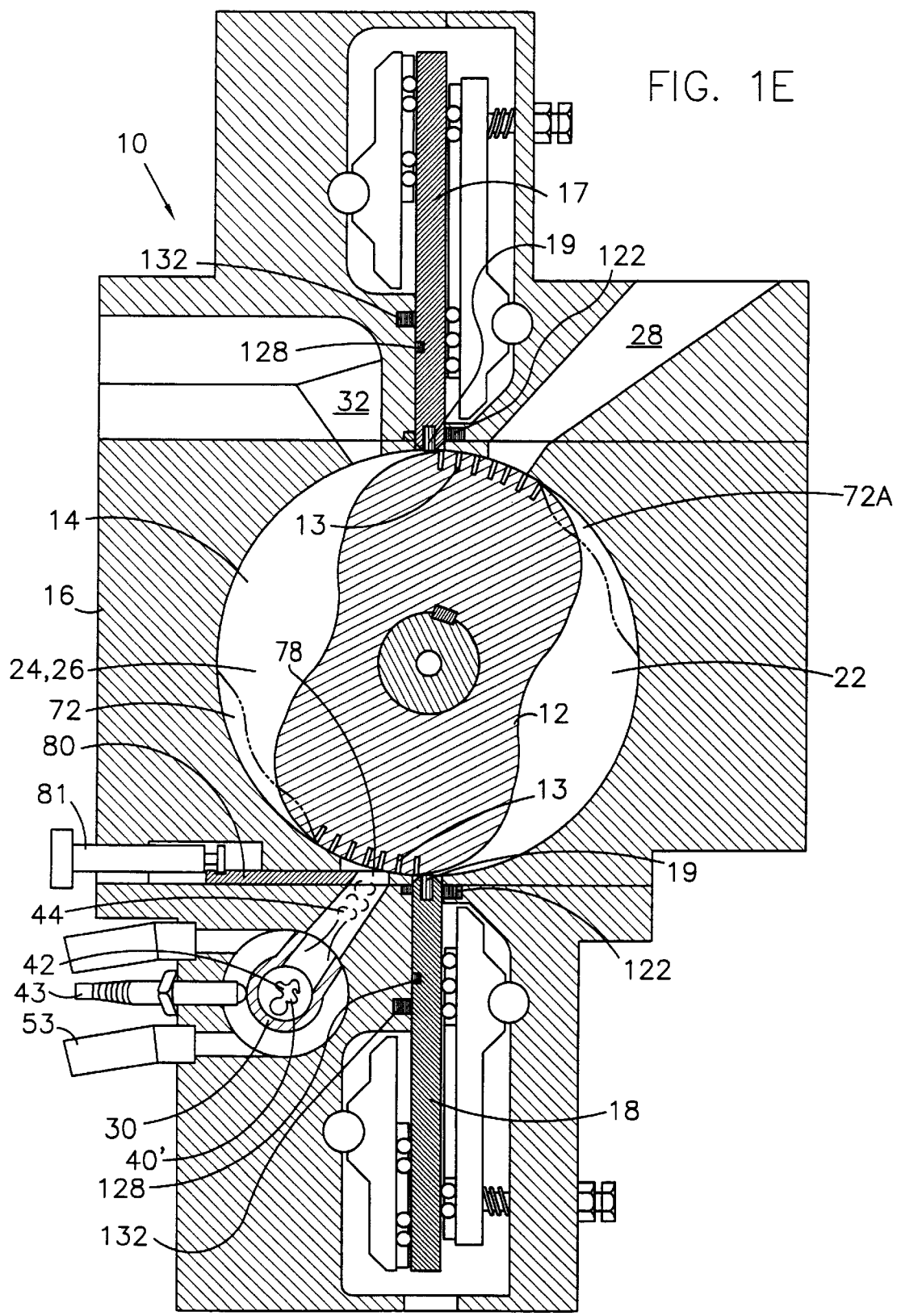

As the rotor 12 continues to rotate from the position shown in FIG. 1D to the position shown in FIG. 1E, preferably a rotation of approximately 30–40°, combustion chamber 30 is gradually sealed by rotor 12 until it is substantially completely sealed in the position shown in FIG. 1E.

Before the combustion chamber 30 is sealed, a fuel 42 may be introduced therein, preferably by injection, as seen in FIG. 1E. Alternatively, a fuel/air mixture may be introduced at the intake port 28, preferably either by injection or carburetion.

Figure 3B:
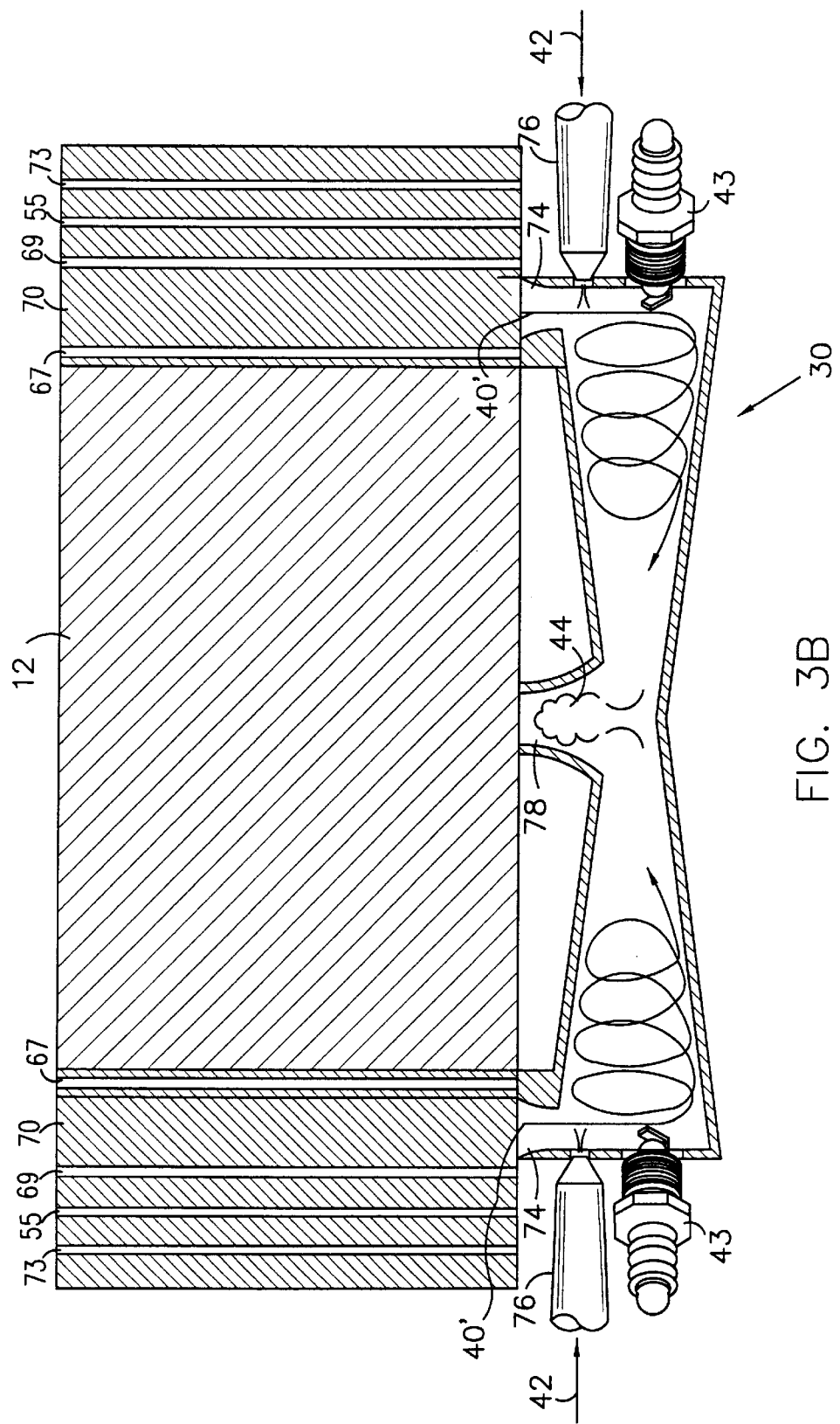

Reference is now additionally made to FIG. 3B, which illustrates pictorially the relative position of rotor 12, grooves 72 and combustion chamber 30 in the position shown in FIG. 1E. At the position shown in FIGS. 1E and 3B, air 40' and fuel 42 are ignited to create a pressurized gas 44. The ignition may be initiated by at least one spark plug 43. Immediately after ignition, rotor 12 continues to rotate past the position shown in FIG. 1E and exit port 78 comes into fluid communication with third chamber 24. The gas 44 then flows into third chamber 24 and applies a force against rotor 12 to rotate the same within the housing 16. This is called the working portion of the operating cycle and occurs during rotation of the rotor 12 from the position shown in FIG. 1E to the position shown in FIG. 1F, preferably a rotation of approximately 135–145°.

Figure 1F:
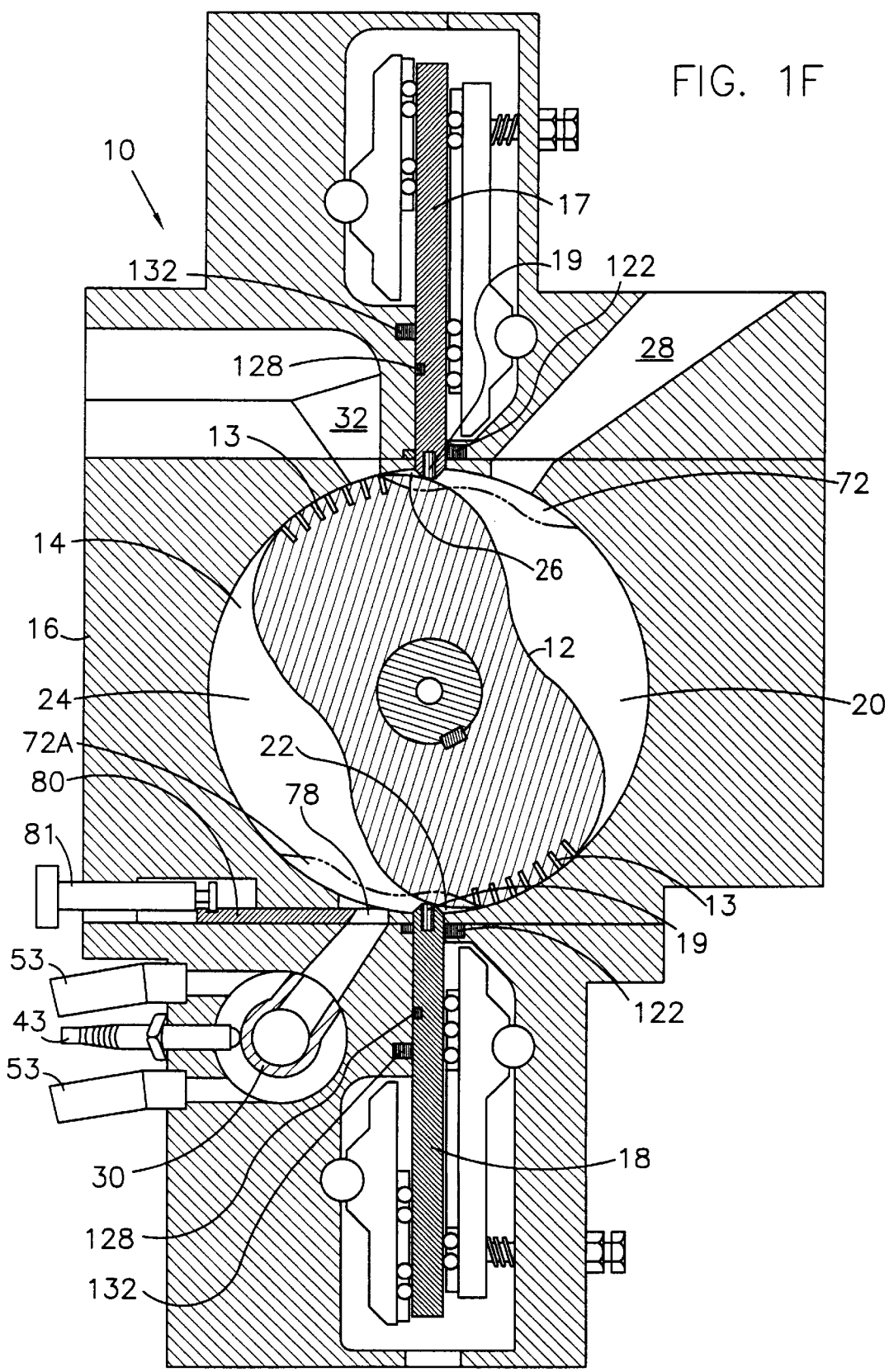
Figure 1G:
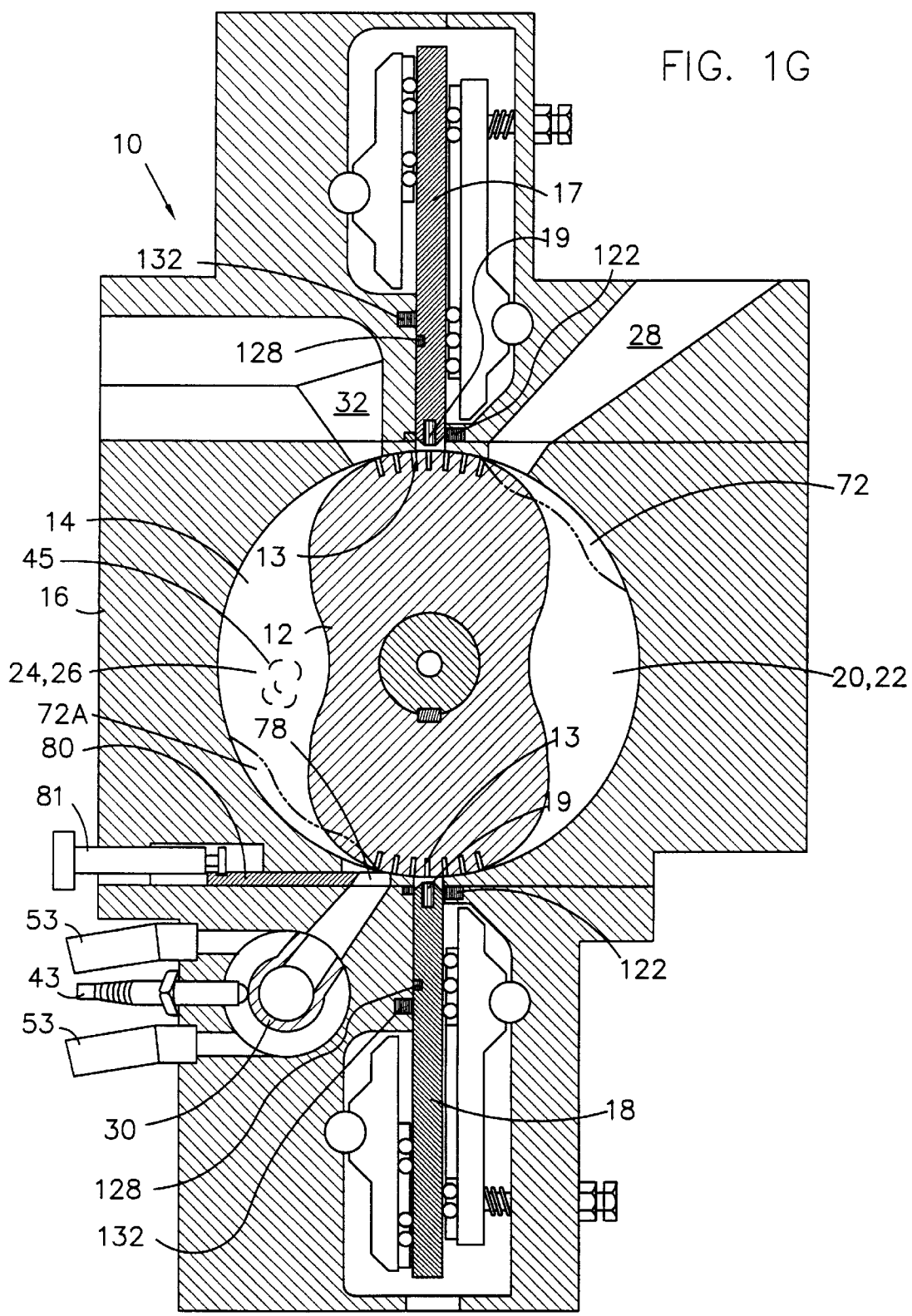

As the rotor continues to rotate from the position shown in FIG. 1F to the TDC position shown in FIG. 1G, preferably a rotation of approximately 16–24°, combustion chamber 30 and exhaust port 32 are substantially sealed by rotor 12.

Figure 1H:
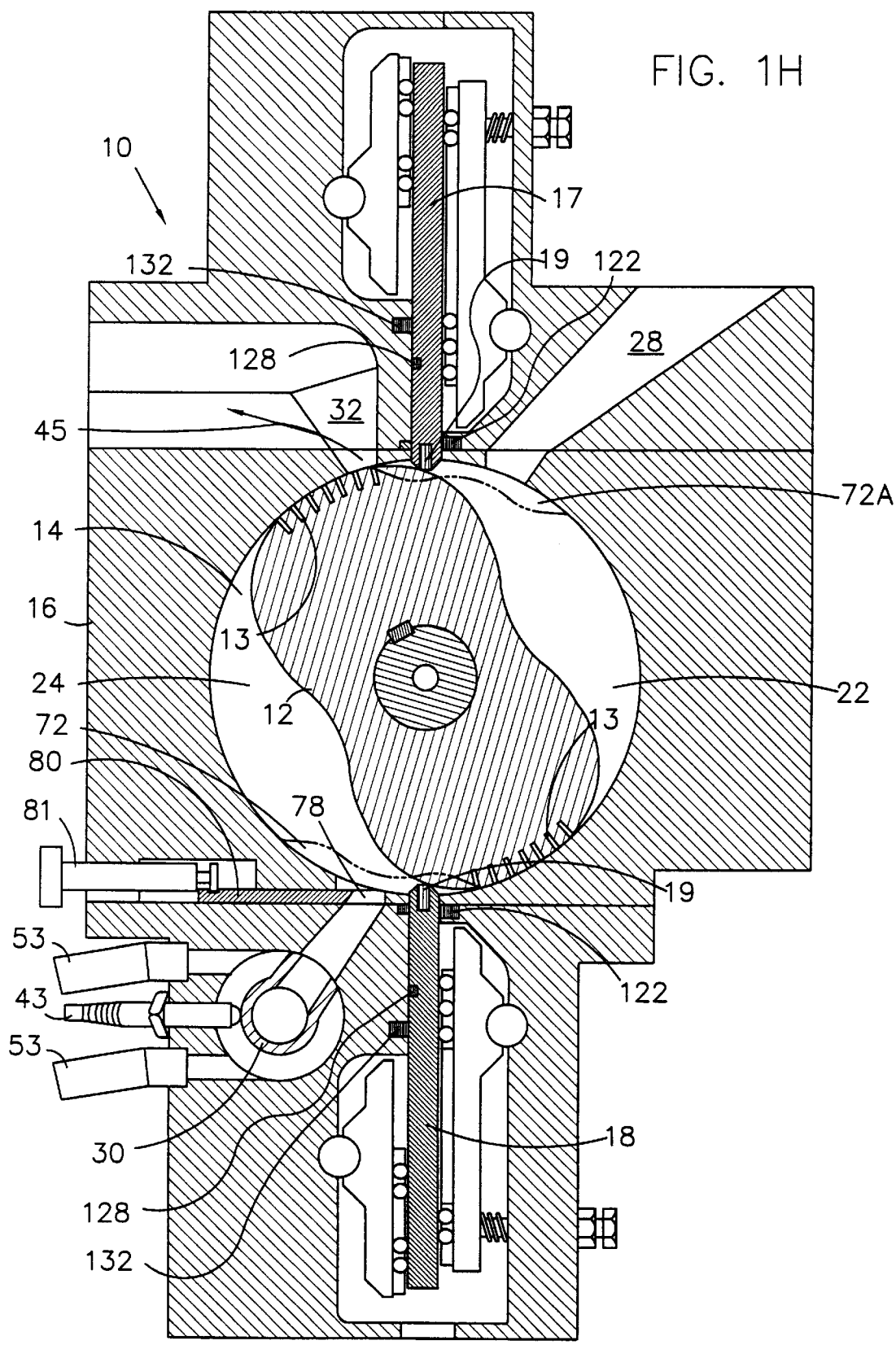

As the rotor continues to rotate from the TDC position shown in FIG. 1G to the position shown in FIG. 1H, preferably a rotation of approximately 165–179', exhaust gases 45 are expelled from fourth chamber 26 through exhaust port 32. Continued rotation of rotor 12 returns the same to the position shown in FIG. 1A, and the cycle is repeated.

Rotor 12 makes two complete revolutions for each cycle described above. At each half turn of rotor 12, a new cycle starts, that is, a fresh inlet of air 40 is drawn through the intake port 28. This means that at the end of a given complete cycle C, the next cycle C+1 is 75% complete, the cycle afterwards C+2 is 50% complete, and the C+3 cycle is 25% complete. Pressurized gas 44 is produced and applies a force on rotor 12 twice during each complete revolution of rotor 12.

It is noted that the rotary engine 10 may operate with a variety of fuels. It may operate, for example, using gasoline according to a standard Otto cycle, in which case a throttle is added to control intake of air 40 through the intake port 28.

The engine 10 may also, for example, operate using Diesel fuel according to a standard Diesel or Dual cycle, in which case the relative volume of combustion chamber 30 to the volume of inner cavity 14 is preferably changed to increase the compression ratio necessary for the Diesel cycle. The housing 16 is preferably thickened and/or strengthened to accommodate the higher pressures of the Diesel cycle.

Having described the operating cycle of the rotary engine of the present invention, some of the advantages of the present rotary engine over conventional piston engines will now be discussed.

For efficient fuel consumption, it is desirable to compress the fuel-air mixture at cool temperatures and bum the mixture at high temperatures. However, in a conventional piston engine, the fuel-air mixture is compressed and burned in the same cylinder, thereby causing a conflict between the low temperature requirement of the compression stroke and the high temperature requirement of the combustion. Because the compression occurs in the same place as the combustion, the temperature of the compressed mixture rises through ambient heat absorption, and the effort of the engine to perform the compression stroke is increased, and thus the net amount of work performed by the engine is reduced. Extreme and rapid temperature changes occur in the cylinder which make great demands on the engine cooling system. Extensive quantities of heat are removed that are not converted to work.

In contrast, it is a particular feature of the present invention that the four stages of the operating cycle occur continuously and simultaneously in isolated, individual chambers. Intake takes place in the first chamber 20, compression takes place in the second chamber 22, combustion occurs in the combustion chamber 30 with the ensuing power stroke in the third chamber 24, and exhaust occurs in the fourth chamber 26. Since combustion occurs in a chamber which is separate from the compression chamber, there is cooler compression and hotter combustion which increase the fuel efficiency. The compressed mixture entering the combustion chamber is relatively cool and contributes to cooling the combustion chamber and absorbs heat generated from the previous combustion, thereby achieving thermal regeneration and reducing the demands on the cooling system.

The rotary engine of the present invention also tends to reduce pollution.

In a conventional piston engine, thousands of combustion cycles take place every minute, wherein each cycle is not continuous, i.e., each cycle has a beginning and an end. Such an operation cycle has, inter alia, two disadvantages:

1) Complete combustion of the mixture is not obtained (due to such factors as lack of time, relatively low temperature of the cylinder walls which draw away heat, hidden cavities, etc.). Therefore, the environmental pollution caused by such engines is relatively high.

2) At the end of each combustion cycle hot gas is exhausted without performing additionally useful work.

In contrast, it is well known in the art that continuous combustion significant reduces the pollution exhausted, such a phenomenon occurring for example in jet engine turbines. In the rotary engine of the present invention, continuous combustion takes place in the combustion chamber and each portion of fuel/air mixture is injected one after the other without prior or complete evacuation of the remnants of the previous combustion cycle. Thus, high temperatures are continuously maintained in the combustion chamber, providing for more complete combustion and reuse (regeneration) of heat.

Reference is now made to FIG. 4 which illustrates a preferred embodiment of a gear train which couples and synchronizes the movement of abutments 17 and 18 with the rotation of rotor 12. Extending from rotor 12 is a pair of first gears 48 which rotate simultaneously with rotor 12. Attached to housing 16 (not shown in FIG. 4) is a pair of second gears 52 which can rotate relative to housing 16. Second gears 52 mesh with first gears 48. The number of teeth of first gears 48 and of second gears 52 are the same, so that any turning of first gears 48 produces an equal rotation of second gears 52.

Second gears 52 are preferably drivingly connected coaxially with third gears 54 which in turn mesh with a pair of fourth gears 56. The fourth gears 56 are preferably not coupled together. Alternatively, the fourth gears 56 may be connected by a shaft 58, shown in broken lines in FIG. 4, which extends through rotor 12, shaft 58 rotating freely through rotor 12. The number of teeth of third gears 54 is twice that of fourth gears 56, such that fourth gears 56 rotate two revolutions per every single revolution of third gears 54.

Connected to each fourth gear 56 is preferably a crankshaft 60. Pivotally connected to crankshafts 60 and to abutments 17 and 18 is preferably a pair of first 62 and second 64 linkage arms, respectively. Crankshafts 60 and linkage arms 62 and 64 allow the rotation of third gears 54 to be translated into a linear movement of abutments 17 and 18, as is well known in the art.

A radius, designated by the letter "r" in FIG. 4, is defined as the radial distance from a centerline 59 of crankshaft 60 to a centerline 61 of a pin 63 which is rotatingly connected to either of linkage arms 62 and 64.

A length, designated by the letter "l" in FIG. 4, is defined as the distance between centerline 61 of pin 63 to an end 65 at the junction of each linkage arm 62 and 64 with each abutment 17 and 18, respectively.

The engine 10 may have one or two output shafts 66 connected to gears 54 as shown in FIG. 4. The use of one output shaft 66 reduces the complexity and frictional losses of the engine 10.

Referring to FIG. 4, it is appreciated that rotation of rotor 12 causes first gears 48 to turn second gears 52. Rotation of second gears 52 causes rotation of third gears 54, which in turn causes rotation of fourth gears 56 and crankshafts 60, which, through linkage arms 62 and 64, cause abutments 17 and 18 to move linearly. Abutments 17 and 18 continually move as rotor 12 rotates within inner cavity 14. Abutments 17 and 18 move from a retracted position to an extended position to allow rotor 12 to rotate within inner cavity 14. The gears have a 2:1 gear ratio so that abutments 17 and 18 move from the extended position to the retracted position and back to the extended position per every half revolution of the rotor 12.

The force required to move the abutments 17 and 18 in their reciprocating motion can be in the order of several tons, depending on their weight and on the rotational speed of rotor 12. However, the total amount of work required to move the abutments 17 and 18 is relatively small. This is because during one half of the cycle of abutment movement, the abutments accelerate, in which work must be done to move the abutments, while in the other half of the cycle, the abutments decelerate, in which the abutments "return" the work invested to move them, except for losses. These losses, which include inter alia, friction losses and differences in accelerations of the abutments due to rotor speed changes, are the total amount of work required to move the abutments. Thus, a relatively small amount of work is required to help maintain generally constant angular velocity. Crankshafts 60 or 66 are preferably constructed in the shape of a flywheel to store angular momentum, thereby to help maintain generally constant angular velocity.

Referring again to FIGS. 1A–1H, and as described hereinabove, abutments 17 and 18 move relative to rotor 12 so that the chambers 20, 22, 24 and 26 are always sealed from one another. Abutments 17 and 18 preferably have a seal 19 at one end which is in constant contact with the rotor 12. The rotor 12 also preferably has seals 13 which are in constant contact with the housing 16. The seals 13 and 19 are preferably conventional seals of the art which include biasing devices, such as small leaf springs, which urge the seals against their contact surfaces. During operation of the engine, any compressed or pressurized gases in the vicinity of seals 13 and 19 tend to further press seals 13 and 19 against housing 16 and rotor 12, respectively, thereby enhancing the degree of sealing.

It is noted that in the present invention the biasing devices are used merely to bias the seals 13 and 19 against their contact surfaces. The forces exerted by such biasing devices are known in the art to be substantially below the level of forces which cause fatigue wear on the surfaces of the rotor 12 and housing 16. This is in contrast to the springs used in the prior art to bias the entire abutment against the rotor, wherein the spring force is formidable and causes high friction losses and fatigue wear on the contact surfaces.

In a preferred embodiment of the present invention, the rotor 12 has truncated ends 15, as shown in FIG. 1A, with an outer contour shaped to match the inner contour of the inner cavity 14. The width of each end 15 is such that the four chambers 20, 22, 24 and 26 are substantially sealed from one another. Preferably the truncation of the rotor 12 subtends approximately 10–30° of arc, most preferably 18–25° of arc, at each end 15 thereof, this angle of truncation being designated by the letter "Y" in FIG. 1A.

Abutments 17 and 18 and seals 13 and 19 substantially prevent fluid communication between the chambers throughout the operating cycle. Rotor 12 is always in substantial contact with housing 16 and movement of abutments 17 and 18 is synchronized with the rotation of rotor 12 so that abutments 17 and 18 remain in substantially constant contact with rotor 12, except at TDC, the reason for which will be explained hereinbelow in conjunction with the shape of rotor 12.

In a preferred embodiment of the present invention, rotor 12 preferably has an outline defined by the following equation:

R=radius of inner cavity 14 for values of $0° \leq a \leq Y°$
and $180° \leq a \leq 180+Y°$,
and elsewhere:

$$R = r\cos 2a + \sqrt{l^2 - r^2 \sin^2 2a} - H$$

where R is a local radius of rotor 12, a is a local rotor radius angle, r is a radius associated with crankshaft 60 and defined hereinabove with reference to FIG. 3, 1 is a length associated with linkage arm 62 and defined hereinabove with reference to FIG. 3, and H is a height of either abutment 17 or 18. Y is the angle associated with the truncation of the rotor 12 and, as described hereinabove with reference to FIG. 1A, is typically 18–25°.

In a preferred embodiment of the present invention, the path traveled by each abutment 17 and 18, for all values of a, is preferably defined by the following equation:

$$P = r\cos 2a + \sqrt{l^2 - r^2 \sin^2 2a} - H$$

where P is the path traveled by the abutment 17 or 18 with respect to the center of the rotor 12.

It is important to note that abutments 17 and 18 always travel in accordance with the above equation, whereas rotor 12 is shaped in accordance with the same equation except for truncated ends 15 which preferably subtend approximately 18–25° of arc as described above. Thus, abutments 17 and 18 are in contact with rotor 12 during the entire engine cycle, except for the truncated ends 15.

If rotor 12 had no truncated ends, then seals 19 of abutments 17 and 18 would come into direct contact with seals 13 of rotor 12. The biasing action of seals 13 and 19 against each other would interfere with the rotation of rotor 12. Thus, the truncation of rotor 12 not only insures that the four chambers 20, 22, 24 and 26 are substantially sealed from one another, but also insures that seals 19 of abutments 17 and 18 do not touch seals 13 of rotor 12. At TDC, seals 13 of rotor 12 seal the chambers from one another.

The inertial forces on seals 19 during the deceleration and acceleration of abutment 17 just before and just after TDC, respectively, also serve to distance seals 19 from seals 13. For example, as rotor 12 approaches TDC, the upward movement of abutment 17 decelerates, in the sense of FIGS. 1A–1H, thereby applying an upwardly directed inertial force on seal 19. The upward force on seal 19 further distances seal 19 from seal 13. As rotor 12 starts to rotate past TDC, abutment 17 starts to accelerate downwards, thereby again applying an upward inertial force on seal 19 and distancing seal 19 from seal 13. It is appreciated that a similar phenomenon occurs at TDC with abutment 18.

The coordinated abutment/rotor movement eliminates the need for formidable springs and/or rocker arms as is required in the art. The unique shaped rotor 12 herein disclosed also increases the chamber volume and compression ratio, thereby increasing the engine efficiency. It is believed that the shape also minimizes the jerk level of the abutments.

Reference is now made again to FIGS. 3A and 3B which are simplified illustrations of combustion chamber 30. Combustion chamber 30 is preferably constructed in the shape of a double cone. The compressed air 40' is introduced via grooves 72 into combustion inlets 74. The inlets 74 are at the large end of each cone. Because each inlet 74 has a large diameter and is located at the periphery of the cone, air 40' is forced to flow spirally inward from each inlet 74 towards the center of combustion chamber 30.

Since fuel 42 is introduced into combustion chamber 30 at a fuel inlet 76 (preferably in the form of a nozzle for fuel injection), each located adjacent a corresponding inlet 74, the swirling flow enhances mixing of air and fuel for more complete combustion as is well known in the art. The same applies for the alternative embodiment in which the fuel/air mixture enters at inlet 74.

In a preferred embodiment of the present invention, at least one spark plug 43 is mounted near each inlet 74. Preferably the fuel/air mixture is ignited by each spark plug 43 to form pressurized gas 44 at the beginning of the swirl. The swirling motion delays pressurized gas 44 from entering the center of combustion chamber 30, thereby allowing pressurized gas 44 which is already at the center of combustion chamber 30 to exit combustion chamber 30 at exit port 78 and enter third chamber 24. Alternatively, at least one spark plug 43 may be placed at the center of combustion chamber 30. In this case, the fuel/air mixture, rather than pressurized gas 44, is delayed by the swirling motion from entering the center of combustion chamber 30

Combustion chamber 30 may be cooled by oil which flows through conduits 53 as shown in FIG. 1A.

Reference is now made again to FIGS. 1A–1H, in which is shown a restricter 80 constructed and operative to restrict the area of exit port 78. In a preferred embodiment of the present invention, restricter 80 is adapted to move linearly inwards or outwards with respect to exit port 78. Preferably there is provided a positioner 81 operative to move restricter 80 linearly.

As restricter 80 is positioned further from exit port 78, pressurized gas 44 is less restricted from exiting combustion chamber 30, thereby varying the force exerted by pressurized gas 44 on rotor 12. Conversely, as restricter 80 is positioned closer to exit port 78, pressurized gas 44 is more restricted from exiting combustion chamber 30, thereby varying the force exerted by pressurized gas 44 on rotor 12. Restricter 80 may be thus considered as an indirect regulator of the compression ratio associated with combustion chamber 30.

Figure 5:
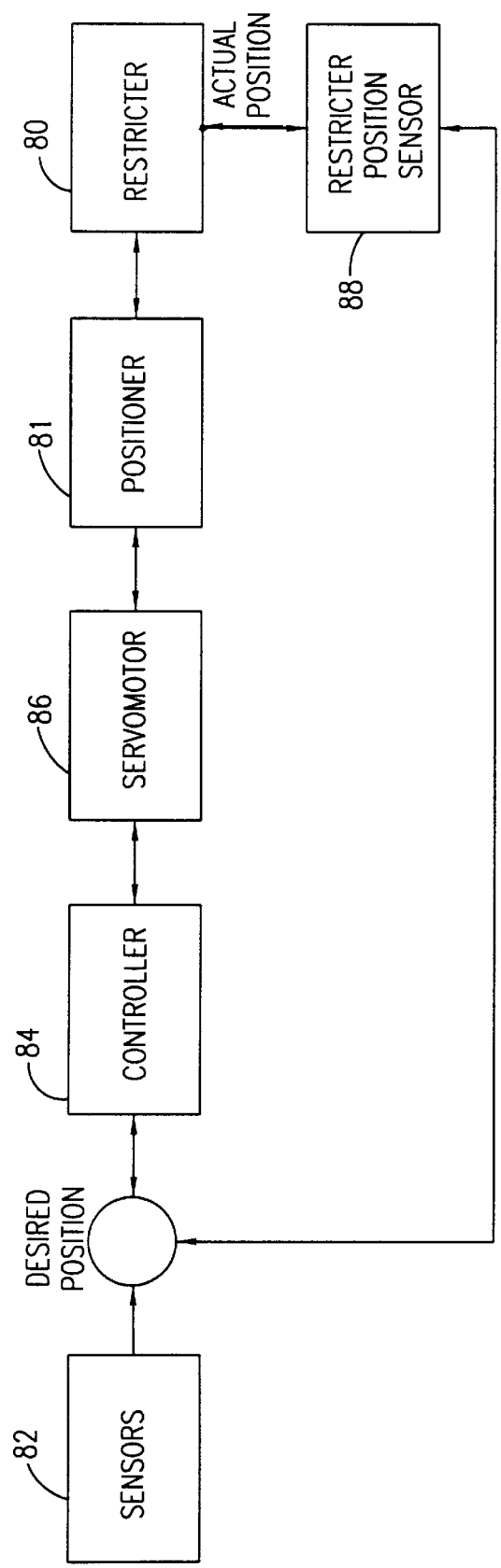
FIG. 5 is a block diagram of a control loop of a restricter useful in the rotary engine of FIGS. 1A–1H.

The position of restricter 80 may be permanently determined or changed manually as desired. Alternatively, as shown in a block diagram in FIG. 5, sensors generally designated by numeral 82 may be employed in a closed control loop together with a controller 84, a servomotor 86 operative to move restricter 80 preferably via positioner 81, and a restricter position sensor 88 to constantly optimize the position of restricter 80. For example, sensors 82 may sense the torque load on the engine and signal controller 84 to operate servomotor 86 to change and optimize the position of restricter 80 accordingly.

Reference is now made to FIGS. 6A–6C which illustrate a linear bearing 90 constructed and operative according to a preferred embodiment of the present invention, and useful in the operation of abutments 17 and 18. The description here is for abutment 17, but applies equally to abutment 18. Linear bearing 90 comprises a fork 92 which pivots about a pivot, preferably a pin 94, located at the center of fork 92. A first throat 96 of fork 92 engages a first drive pin 98 which is attached to abutment 17. A second throat 100, situated on the opposite end of fork 92, engages a second drive pin 102 mounted on a support 104 which is preferably pivotally attached to housing 16 by means of a pin 106. Pivot pin 94 is preferably mounted on a separator 108 which is free to slide vertically between abutment 17 and support 104. In order to facilitate the vertical linear motion of separator 108, roller elements 110 are rotatably attached to separator 108. Recesses 112 and 114 may be machined respectively in support 104 and abutment 17 to decrease the volume needed for mounting linear bearing 90.

Preferably the linear bearing 90 shown in FIGS. 6A–6C operates in a pair with another identical linear bearing 90 mounted on the opposite side of pivot 94. Additionally, it is possible to mount linear bearings 90 to each individual roller element 110.

When abutment 17 is in a retracted position as shown in FIG. 6A, both drive pins 98 and 102 are situated at the extreme end of respective throats 96 and 100. As abutment 17 moves linearly downward as shown in FIG. 6B, drive pins 98 and 102 slide inward along throats 96 and 100 respectively. Further downward linear movement of abutment 17 causes drive pins 98 and 102 to slide outward and return to the extreme end of respective throats 96 and 100, as shown in FIG. 6C. At this point, abutment 17 reaches an extended position and starts to move upward back to the retracted position shown in FIG. 6A.

It is a particular feature of linear bearing 90 that it maintains substantial parallelism between abutment 17 and support 104 of housing 16 throughout the entire reciprocating cycle of vertical motion of abutment 17 with respect to support 104. It is further noted that conventional linear bearings known in the art generally have roller elements which, in such a reciprocating motion application, tend to creep or slide along the surfaces upon which they roll. This is due to unequal frictional forces between the rolling surfaces. As is known in the art, retaining mechanisms are incorporated in the design of the linear bearing to prevent the linear bearing from "escaping" the sliding surfaces. In contrast to the prior art, roller elements 110 remain in the same place with respect to the two sliding surfaces, due to the central pivot 94 and action of fork throats 96 and 100 and drive pins 98 and 102, respectively.

Figure 7:
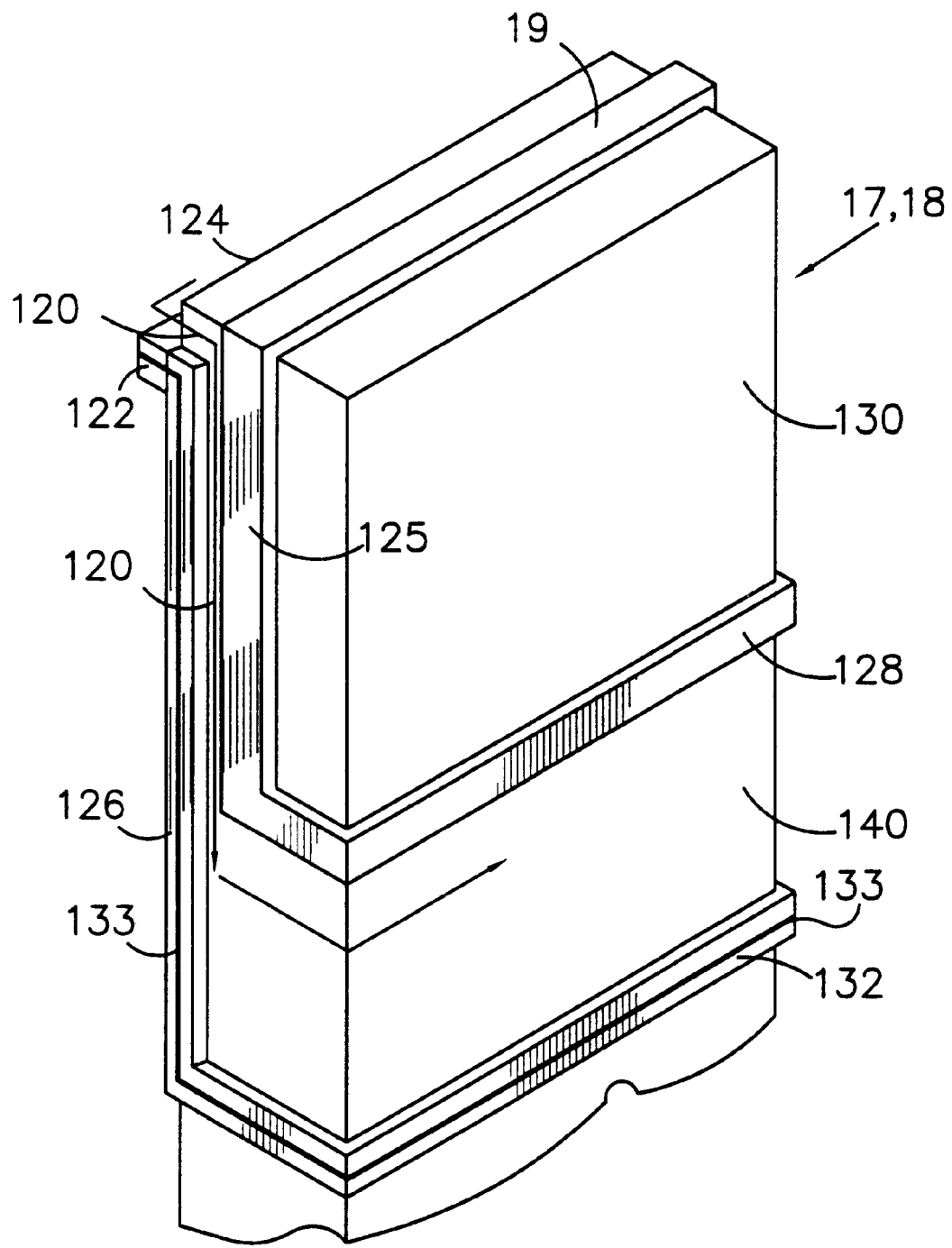
FIG. 7 is an illustration of a feature of the rotary engine which helps to reduce stress on the abutments and linear bearings.

Reference is now made to FIG. 7 which illustrates an assembly of seals which helps to reduce stress on abutments 17 and 18 and linear bearings 90. As described above with reference to FIG. 1E, during the exit of pressurized gas 44 from compression chamber 30 into third chamber 24, the side of second abutment 18 facing third chamber 24 is exposed to a relatively high pressure whereas the side facing second chamber 22 is exposed to a relatively low pressure. The relatively high pressure difference between one side of second abutment 18 and the other side, typically in the order of 10:1, may cause a bending moment on second abutment 18 which can hinder the linear motion of second abutment 18. In addition, since the pressurized gas 44 exits combustion chamber 30 twice for each revolution of rotor 12, the pressure difference occurs cyclically. Thus, the bending moment is cyclical in nature and may cause fatigue stress in second abutment 18.

A pressure difference is also associated with first abutment 17. During the intake of air 40 through intake port 28, the side of first abutment 17 exposed to fourth chamber 26 is exposed to a relatively high pressure whereas the side exposed to first chamber 20 is exposed to a relatively low pressure. Since the intake of air 40 occurs twice for each revolution of rotor 12, the pressure difference occurs cyclically. Thus, first abutment 17 is also exposed to a cyclical bending moment, although of a smaller magnitude than for second abutment 18, typically in the order of 4:1.

To help reduce stress on the abutments 17 and 18 and linear bearings 90, housing 16 (not shown in FIG. 7) is preferably provided with a plurality of seals as shown in FIG. 7. A first seal 122 is preferably located in the housing 16 on a low pressure side 124 of each abutment 17 and 18. Each first seal 122 preferably extends across the width of each abutment. The first seals 122 are also shown in section in FIGS. 1A–1H.

Each seal 19 of abutments 17 and 18 preferably extends not only along the width of each abutment, but also comprises two side portions 125, each along one side of the abutment, and a portion 128 along the width of each abutment, as shown in FIG. 7. The portion 128 of seal 19 is also shown in section in FIGS. 1A–1H. Relatively high pressure fluid is confined within a region 130, defined by the substantially sealed engagement of seals 19, 125 and 128 with rotor 12 and housing 16, respectively.

A second seal 126 is preferably located in the housing 16 along the side of each abutment 17 and 18, generally parallel and adjacent the extension of seal 19, as shown in FIG. 7.

A third seal 132 is preferably located in the housing 16 on the same side as high pressure region 130 of each abutment 17 and 18, generally parallel to each corresponding portion 128 of seal 19 and separated therefrom in a direction away from the center of the rotor 12, as seen in section in FIGS. 1A–1H. Each third seal 132 preferably extends across the width of each abutment. First 122, second 126 and third 132 seals substantially prevent external leakage from second chamber 22. In accordance with a preferred embodiment of the present invention, a channel 133 is formed in first 122, second 126 and third 132 seals through which pressurized oil may flow. The pressurized oil further prevents external leakage from second chamber 22.

It is noted that the first 122, second 126 and third 132 seals are fixed in the housing 16. As each abutment slides linearly with respect to the housing 16, each of the first 122, second 126 and third 132 seals remain in substantially sealed contact with the corresponding abutment, and seals 19, 125 and 128 remain in substantially sealed contact with housing 16 and rotor 12.

As described hereinabove with reference to seals 13 and 19, seals 125, 128, 122, 126 and 132 preferably include biasing devices, such as small leaf springs, which urge the seals against their contact surfaces. During operation of the engine, any compressed or pressurized gases in the vicinity of the seals tend to further press the seals against housing 16 or rotor 12, thereby enhancing the degree of sealing.

A channel 120 is formed on the low pressure side 124 of each abutment by a gap between first seal 122 and the space between second seal 126 and the side portion 125 of seal 19. Fluid matter may pass through channel 120 from the low pressure side 124 to the side of high pressure region 130, where it is substantially bounded and sealed by the portion 128 of the seal 19 and the third seal 132, this region being designated by reference numeral 140.

The low pressure fluid matter in region 140 applies a force against each abutment towards low pressure side 124. Thus, instead of each abutment bearing a high pressure in region 130, each abutment now bears an additional low pressure in region 140. The additional force due to the low pressure acting on region 140 tends to diminish the bending moment which the high pressure acting on region 130 would have caused. Each abutment is thus subjected to a generally lateral force directed towards the low pressure side 124. This lateral force is borne by the linear bearings 90.

While the invention has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A linear bearing comprising:
   a fork having a first throat and a second throat, said fork being pivoted about a pivot, said first throat being slidably engaged with a sliding member and said second throat being slidably engaged with a stationary member, such that as said sliding member slides relative to said stationary member, said fork pivots about said pivot, said first throat slides with respect to said sliding member and said second throat slides with respect to said stationary member such that said sliding member remains generally parallel to said stationary member.

2. The linear bearing according to claim 1 and wherein said pivot is located between said first and said second throats.

* * * * *

UNITED STATES PATENT AND TRADEMARK OFFICE
CERTIFICATE OF CORRECTION

| | |
|---|---|
| PATENT NO. : 6,065,874 | |
| DATED : May 23, 2000 | |
| INVENTOR(S) : Benjamin Tour | |

It is certified that error appears in the above-identified patent and that said Letters Patent is hereby corrected as shown below:

Title Page,
The address of the inventor should be:

3 Tarshish Street
Kiryat Gat 83000,
ISRAEL.

Signed and Sealed this

Twenty-sixth Day of June, 2001

*Attest:*

*Attesting Officer*

NICHOLAS P. GODICI
*Acting Director of the United States Patent and Trademark Office*